United States Patent Office 2,921,891
Patented Jan. 19, 1960

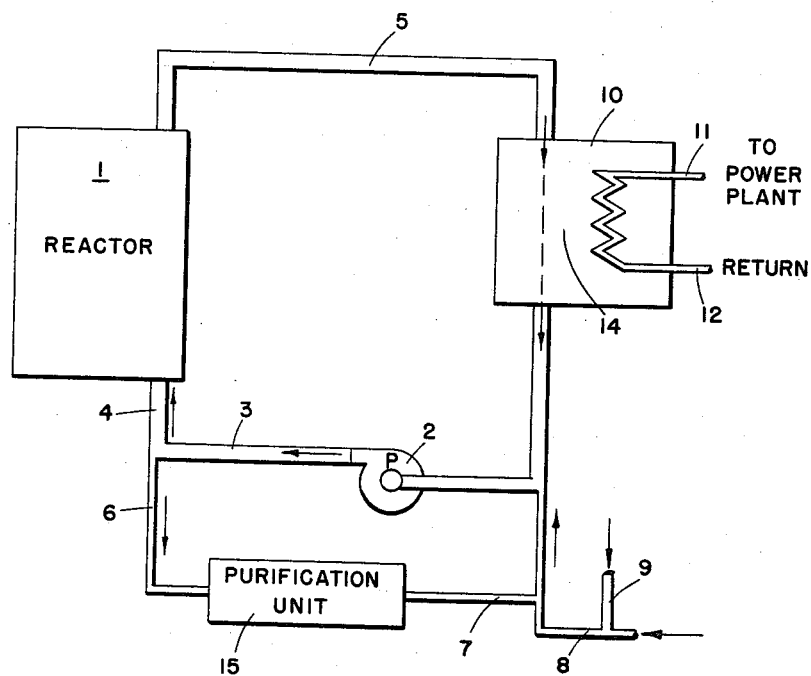
INVENTORS.
EUGENE L. COLICHMAN
BY DENIS J. ZIGRANG
ATTORNEY

2,921,891

REACTOR COOLANT-MODERATOR

Eugene L. Colichman, Los Angeles, and Denis J. Zigrang, Whittier, Calif., assignors to North American Aviation, Inc.

Application January 13, 1955, Serial No. 481,514

3 Claims. (Cl. 204—154.2)

This invention is directed to the formation of a new nuclear reactor coolant and/or moderator mixture and to methods of increasing the viscosity and stability of specific groups of organic nuclear reactor coolants.

Various organic compounds have been suggested for use as the primary or secondary coolant in a nuclear reactor. Although the heat exchanging characteristics and moderating qualities of these coolants are satisfactory, their use has been severely limited due to low pyrolytic and radiation stabilities and to a proportionately high decrease in viscosity at elevated temperatures. This decrease in viscosity raises problems in pump wear and pump sealing due to the fact that these organics become so thin as to have no lubricating properties.

Organic coolants and moderators are subjected to various forms of radiation within a nuclear reactor. The alpha, beta, gamma, fast neutron and other radiation energies emitted from the nuclear reactor have been found to have a definite tendency to cause formation of organic free radicals in the coolant presumably due to a cleavage of the ring structure of the organic coolant. It has been further found that these organo free radicals simultaneously polymerize as they are formed. Thus, when the organic materials are subjected to elevated temperatures and/or radiation damage a dissociation process and simultaneous polymerization of the dissociated products occurs. While this polymerization tends to increase the over-all viscosity of the coolant the actual value of viscosity at elevated temperatures is still extremely low; resulting in the aforesaid mentioned pumping difficulties.

The above problems attendant to the use of organic liquid coolants in nuclear reactors are eliminated by the present invention. It has been determined that by dispersing certain inorganic materials, namely, graphite or molybdenum disulfide, within the hereinafter described liquid hydrocarbon nuclear coolants or moderators, a mixture can be obtained possessing enhanced thermal and radiation stability, higher thermal conductivity, and increased viscosity with a resultant gain in lubricating qualities, while retaining essentially the moderating properties of the organic liquid.

An object of this invention is to provide a novel nuclear reactant coolant.

A further object of this invention is to provide a novel nuclear reactor moderator.

A still further object of this invention is to provide a coolant or moderator mixture including a liquid hydrocarbon and an inorganic additive.

An additional object of this invention is to provide a method of making a hydrocarbon reactor coolant or moderator more stable.

A further object of this invention is to provide a method of reducing pump wear and leakage in a nuclear reactor coolant loop.

A still further object of this invention is to provide a method of cooling a nuclear reactor.

An additional object of this invention is to provide a method of increasing the viscosity of a liquid hydrocarbon at elevated temperatures.

A further object of this invention is to provide a method of reducing pump wear and leakage in the pumping of liquid hydrocarbons at elevated temperatures.

Other objects of invention will become apparent from the following description taken in connection with the accompanying drawing, in which the figure illustrates a typical coolant loop for a hydrocarbon moderated and cooled nuclear reactor.

The coolant loop illustrated in the figure comprises a nuclear reactor 1, a coolant pump 2 and the necessary flow lines. In addition, a purification unit 15 will ordinarily be provided to constantly or intermittently purify the circulating coolant. This purification unit may take the form of conventional distillation, cold-trapping, adsorption or crystallization apparatus which will remove or partially remove polymerized products formed by pyrolytic and radiolitic exposure of the coolant. As shown schematically, the heat from the coolant loop may be extracted in a steam boiler 10 in which a working fluid passes in heat exchanging relationship at 14 with the hydrocarbon-base coolant in line 5 and is circulated by line 11 to a power plant and thence returned by line 12 to said boiler. Make-up of the particular hydrocarbon and inorganic additive is made at 8 and 9, respectively. Flow of the coolant from pump 2 along line 3 is split into the reactor inlet line 4 and the purification unit inlet line 6. Flow of purified coolant along line 7 merges with any necessary coolant make-up from lines 8 and 9, and is recycled along with the outgoing coolant from the steam boiler. The pumping process affords continual flow through the loop creating continual agitation of the coolant preventing settling of the suspended inorganic material.

The new and novel reactor coolant or moderator of this invention comprises particular types of organic compounds coupled with particular inorganic materials as additives. It has been determined that aromatic hydrocarbons and alkylated aromatic hydrocarbons should be used as base materials for the coolant due to their relatively high stability when subjected to pyrolytic and radiation effects. In the case of use of a moderator, the alkylated aromatic hydrocarbons are preferred due to their higher hydrogen content. The applicable aromatic hydrocarbons are the polyphenyls and the condensed ring compounds. Specifically, biphenyl, ortho-, meta-, or para-terphenyl, the quaterphenyls, and quinquephenyls may be given as examples of the polyphenyls used, while naphthalene, anthracene, picene, and phenanthrene may be given as examples of the condensed ring compounds. The applicable alkylated aromatic hydrocarbons are the alkyl benzenes. Specifically, alkyl benzenes having molecular weights of 250 and 350, commercially available from the California Research Company, San Francisco, California, which consist of mixtures of mono- and dialkylated benzene compounds such as benzene with a side chain of 12 carbon atoms and benzene with two side chains of 9–15 carbon atoms each, are usable. The operating range of the above hydrocarbon coolants may be generally given as from 100°–500° C. The above hydrocarbons have melting points which enable them to be in the liquid state in this range. For example, meta-terphenyl melts at approximately 87° C., para-terphenyl melts at 213° C., 4,4'-diphenyl biphenyl ($C_{24}H_{18}$) at 307–320° C., 1,3,5 triphenyl benzene ($C_{24}H_{18}$) at 174° C., and 2,2' binaphthyl ($C_{20}H_{18}$) at 187°.

The following Table I includes various physical properties of typical liquid hydrocarbons usable as nuclear reactor coolants and moderators.

Table I

[At indicated temperatures.]

| Organic | Density, g./cm.³ | Viscosity, Centistokes | | M.P., °C. | H₂ Content, H atom/cc. | Thermal K, B.t.u./hr.ft.,°F. | B.P., °C. 1 atm. |
|---|---|---|---|---|---|---|---|
| Biphenyl | 0.78⁶⁰⁰ | 0.92¹³⁰ | | 71 | 3.01×10⁻²² | 0.08⁶⁰⁰ | 254 |
| p-terphenyl | 0.94²⁵⁰ | 4.0¹⁰⁰ | 0.92⁰⁰ | 213 | 3.51×10⁻²² | 0.06 | 389 |
| o-quaterphenyl | | | | 119 | | | 420 |
| Naphthalene | 1.15⁴ | *1.26⁸⁰ | | 80 | | 0.22 | 218 |
| Alkylbenzene²⁵⁰ | 0.86¹⁰⁰ | 7.0¹⁰⁰ | 1.0³⁰⁰ | 32 | ¹⁰⁰6.3×10⁻²² | | 230 |
| Alkylbenzene³⁵⁰ | 0.87¹⁰⁰ | 25.5¹⁰⁰ | 1.7³⁰⁰ | 32 | ¹⁰⁰6.76×10⁻²² | | 335 |

*Centipoises.

The present invention contemplates the addition of a suspension of graphite or molybdenum disulfide within the above mentioned liquid hydrocarbons or combinations thereof. These inorganic additives are added to the hydrocarbons in the form of highly divided powders creating the suspension of the powder within the liquid hydrocarbon. Graphite, and to a lesser degree molybdenum disulfide, have high stability toward heat and irradiation effects, a low neutron capture cross-section, good moderating ability, and relatively good thermal conductivity. In addition, when these inorganic materials are dispersed within the liquid hydrocarbons the lubrication properties of the over-all mixture are enhanced. This phenomenon is particularly important when the mixture is being used in a closed coolant loop and wherein the coolant is being pumped. The addition of these inorganic materials to the liquid hydrocarbons in coolant applications or otherwise greatly reduces pump wear and pump leakage at elevated temperatures. The physical properties of the additives used in this invention are set out in Table II below.

Table II

| | Density | Melting Point, °C. | Neutron X-section, Barns | Thermal Conductivity, B.t.u./hr.-ft.,°F. | |
|---|---|---|---|---|---|
| Graphite | 1.6–2.3 | 3,300 | 0.0045 | 87 | |
| MoS₂ | 4.8 | 1,185 | 2.4 | | |

Various proportions of inorganic additives to the liquid hydrocarbons are usable in the present invention. With respect to additions of graphite or molybdenum disulfide in thermal applications a saturated dispersion will generally be desired. The actual weight percentage of graphite or molybdenum disulfide within any particular hydrocarbon liquid coolant, being used in a closed loop, is dependent upon factors such as the degree of fineness of the material, the degree of agitation within the loop, the flow rate and the specific loop design. It has been determined that additions of graphite in the amount of 0.1–20% by weight enhance both the stability and lubrication qualities of the liquid hydrocarbons of this invention. With respect to molybdenum disulfide additions of from 0.1–10% may be made. Each of these inorganic materials should be added in finely divided form preferably of −200 mesh. Any commercially available graphite is usable as the inorganic additive.

The following is given as an example of practicing the instant invention. Approximately 5% by weight of finely divided graphite, chosen preferentially over the molybdenum disulfide, due to its lower density, lower neutron capture cross-section and higher stability, is dispersed or suspended within the hydrocarbon para-terphenyl. In the case of use as a nuclear coolant, the mixture must be preheated (before or after the graphite addition) to a liquid state and is then pumped through the nuclear reactor in heat exchanging relationship therewith. By reason of the presence of graphite particles within the coolant a method of coolant viscosity control and a method of reducing pump wear and leakage is provided.

Although the invention has been described and illustrated in detail, it is to clearly understood that the same is by way of illustration and example only and is not to be taken by way of limitation, the spirit and scope of this invention being limited only by the terms of the appended claims.

We claim:

1. A method of inhibiting radiolitic damage to an aromatic hydrocarbon under nuclear irradiation, which comprises adding a material selected from the group consisting of graphite and molybdenum disulfide to a hydrocarbon selected from the group consisting of biphenyl, terphenyl, quaterphenyl, quinquephenyl, naphthalene and alkylbenzenes having alkyl side chains of 9–15 carbon atoms.

2. A method of inhibiting radiolitic damage to naphthalene under nuclear irradiation, which comprises adding a material selected from the group consisting of graphite and molybdenum disulfide to said naphthalene.

3. A method of inhibiting radiolitic damage to terphenyl under nuclear irradiation, which comprises adding a material selected from the group consisting of graphite and molybdenum disulfide to said terphenyl.

References Cited in the file of this patent

UNITED STATES PATENTS

| | | |
|---|---|---|
| Re. 19,436 | Kidder | Jan. 22, 1935 |
| 966,636 | Acheson | Aug. 9, 1910 |
| 1,727,109 | Klees | Sept. 3, 1929 |
| 1,980,097 | Ruddies | Nov. 6, 1934 |
| 2,622,993 | McCullough et al. | Dec. 23, 1952 |
| 2,671,758 | Vinograd et al. | Mar. 9, 1954 |
| 2,686,156 | Arntzen et al. | Aug. 10, 1954 |
| 2,708,656 | Fermi et al. | May 17, 1955 |

FOREIGN PATENTS

| | | |
|---|---|---|
| 697,601 | Great Britain | Sept. 23, 1953 |
| 708,901 | Great Britain | May 12, 1954 |

OTHER REFERENCES

Industrial and Engineering Chemistry, August 1936, vol. 28, No. 8, pp. 970–983.

KAPL-731, Atomic Energy Commission Document, April 2, 1953; pages 3–7.